United States Patent

[11] 3,627,403

| [72] | Inventor | Peter Hedgewick<br>Windsor, Ontario, Canada |
|---|---|---|
| [21] | Appl. No. | 856,957 |
| [22] | Filed | Sept. 11, 1969 |
| [45] | Patented | Dec. 14, 1971 |
| [73] | Assignee | Reflex Corporation of Canada Limited<br>Amberstburg, Ontario, Canada |

[54] ROADWAY REFLECTORS
3 Claims, 3 Drawing Figs.

[52] U.S. Cl. .................................................. 350/103,
94/1.5
[51] Int. Cl. .................................................. G02b 5/12
[50] Field of Search .......................................... 350/67,
102, 103, 109; 94/1.5

[56] References Cited
UNITED STATES PATENTS

| 3,266,371 | 8/1966 | Gunderson .................. | 350/67 |
| 3,392,639 | 7/1968 | Heehan et al................ | 94/1.5 |
| 3,409,344 | 11/1968 | Balint et al................... | 350/103 |

*Primary Examiner*—David Schonberg
*Assistant Examiner*—Michael J. Tokar
*Attorney*—Barnard, McGlynn & Reising

ABSTRACT: A roadway reflector comprising an integral hollow housing of plastic material including a base portion and a wall extending upwardly and inwardly and having a portion of transparent plastic material with a smooth outer surface and inner surfaces formed with retroreflective prisms. A layer of this plastic film is adhered to the periphery of the portion of the wall containing the prisms and a resin fills the housing, an air space thereby being provided between the film and the surfaces of the prisms.

PATENTED DEC 14 1971

3,627,403

INVENTOR
PETER HEDGEWICK
BY
Barnes, Kisselle, Raisch & Choate
ATTORNEYS

ROADWAY REFLECTORS

This invention relates to roadway reflectors.

BACKGROUND OF THE INVENTION

In roadway reflectors made of plastic, such as in the U.S. Pat. to Balint et al. No. 3,409,344, the reflector comprises a hollow plastic housing which has inclined side and end walls and a flat top wall. The housing is molded in situ about the periphery of previously molded reflective inserts so that the inserts are in the end walls. The inserts have substantially flat outer surfaces and a plurality of retroreflective prisms on the inner surfaces thereof, the axes of the prisms forming an angle with the plane of the insert and in turn with the pavement when the marker is in position such that the light beams from the automotive vehicle are reflected back to the eyes of the driver. The surfaces of the prisms are coated with a metallized layer and the entire housing is filled with a plastic material to provide strength and rigidity to the marker.

It has been found that the provision of the metallized layer substantially reduces the efficiency of the prisms as well as requiring additional cost of application.

Among the objects of the invention are to provide a roadway reflector of the type shown in the Balint et al. patent which does not require the metallized layer and which produces a much greater efficiency of reflection.

SUMMARY OF THE INVENTION

In accordance with the invention, a thin flexible plastic film is sealed about the periphery of the portion of the wall containing the prisms in overlying relationship to the prisms before the resin is introduced to fill the housing. This creates air spaces between the prisms and the film so that efficient reflection will be achieved without the use of a metallizing layer.

DESCRIPTION

Figure 1:
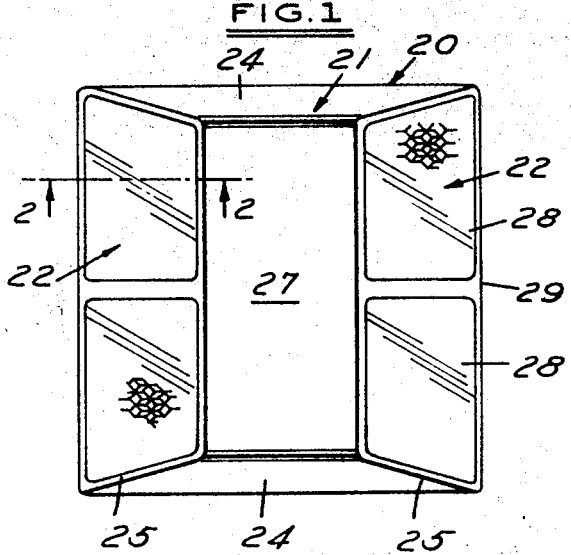
FIG. 1 is a plan view of a roadway marker embodying the invention.
Figure 2:
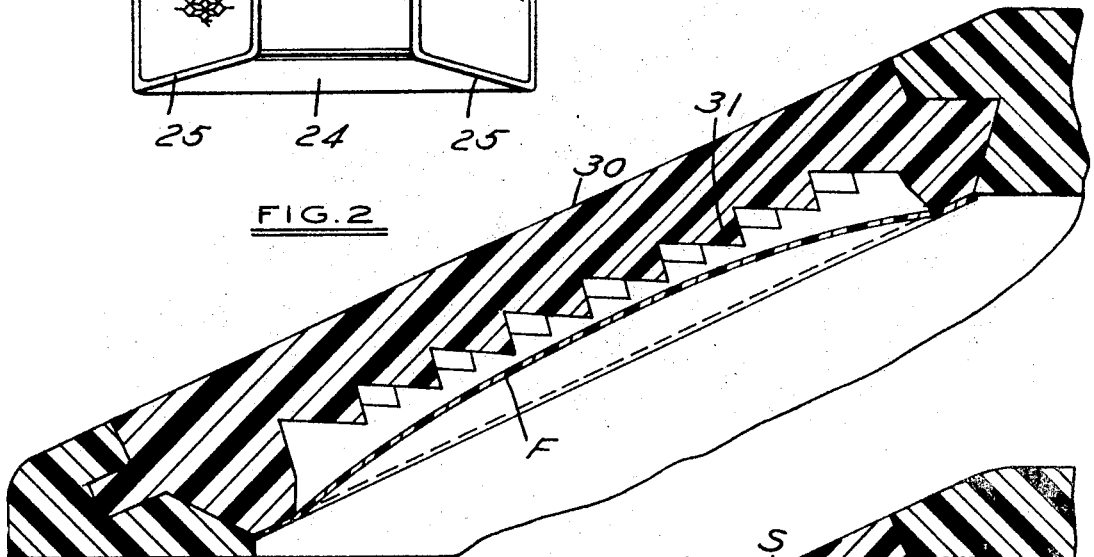
FIG. 2 is a fragmentary sectional view taken along the line 2—2 in FIG. 1 showing the roadway marker during manufacture.
Figure 3:
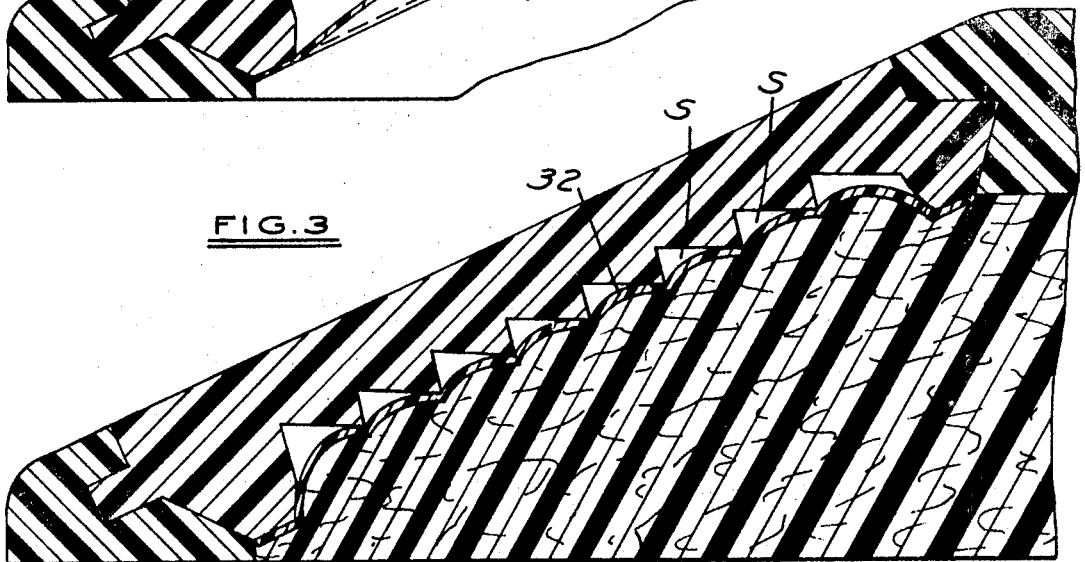
FIG. 3 is a fragmentary sectional view taken along the line 2—2 in FIG. 1.

Referring to FIGS. 1-3, the roadway reflector 20 embodying the invention comprises a housing 21 which is molded in situ about reflective inserts 22, as more fully described below. The housing 21 is hollow and comprises sidewalls 24, end walls 25 in which the inserts 22 are embedded and a flat top wall 27.

As shown in the aforementioned patent to Balint et al. U.S. Pat. No. 3,409,344, each reflective insert 22 comprises spaced walls 28 connected by an integral web 29. Each wall 28 includes an outer surface 30 that is substantially flat and an inner surface having a plurality of retroreflective prisms 31 thereon. The prisms 31 are preferably formed by three right angle surfaces in accordance with well-known retroreflective prism construction. The angles of the axes prisms with respect to the general plane of the wall 28 and in turn the surface 30 is such that the prisms will reflect the light beam from the rays of the automobile.

In accordance with the invention, a thin film F of plastic which is flexible is adhered at its periphery to the reflective insert 22 prior to molding the housing 21 about the periphery of the insert (FIG. 2). The sealing is preferably achieved by heat-sealing process.

After the housing is molded about the insert in accordance with the method and apparatus shown in Balint et al. U.S. Pat. No. 3,409,344, the plastic material R such as epoxy resin is introduced into the housing. The plastic material R fills the housing and tends to flex the film toward the surfaces of the prisms thereby causing the apices of the prisms to form small indentations 32 in the resin. However, spaces are formed which obviates the need for any metallizing.

In a modified method forming the roadway reflector, the film can be applied to the inserts under vacuum to create a subatmospheric condition in the spaces between the film and the surfaces of the prism. This not only increases the size of the indentations 32 and strengthens the reflector but, in addition, removes any moisture or other similar contaminants that might be sealed in the spaces and thereby increases the life of the roadway marker.

The film F may be made of any flexible material such as organic plastic film. Satisfactory results have been achieved with vinylidene chloride film, sold under the trademark Saran by Dow Chemical Co., and having a thickness of 0.0015 inch.

I claim:
1. A roadway reflector comprising
   an integral housing including a base portion, a top wall and peripheral walls,
   one of said walls having a portion tapering upwardly and inwardly and made of transparent plastic material,
   said portion comprising an outer smooth surface and an inner surface formed with retroreflective prisms having apices and reflecting surfaces,
   a film of flexible plastic material overlying said prisms and sealed to the periphery of said inner surface of said portion of said one wall, and
   a mass of resin filling said housing,
   said resin contacting said film,
   said film contacting said apices of said prisms and being spaced from the major portions of the reflecting surfaces of said prisms.
2. The combination set forth in claim 1 wherein said film comprises vinylidene chloride.
3. A roadway reflector comprising a hollow housing defining a cavity with a wall having a portion thereof made of transparent plastic material,
   said portion comprising an outer smooth surface and an inner surface formed with retroreflective prisms having apices and reflecting surfaces,
   a film of flexible plastic material overlying said prisms,
   a mass of resin filling said cavity of said housing,
   said resin contacting said film,
   said film contacting said apices of said prisms and being spaced from the major portion of the reflecting surfaces of said prisms.

* * * * *